United States Patent
Yoshida et al.

(10) Patent No.: US 7,784,634 B2
(45) Date of Patent: *Aug. 31, 2010

(54) FUEL FILLER CAP

(75) Inventors: Hiromitsu Yoshida, Soja (JP); Takami Ono, Soja (JP)

(73) Assignee: Asteer Co., Ltd., Okayama (JP)

( * ) Notice: Subject to any disclaimer, the term of this patent is extended or adjusted under 35 U.S.C. 154(b) by 1519 days.

This patent is subject to a terminal disclaimer.

(21) Appl. No.: 11/121,564

(22) Filed: May 4, 2005

(65) Prior Publication Data

US 2005/0263525 A1 Dec. 1, 2005

(30) Foreign Application Priority Data

May 28, 2004 (JP) ............................. 2004-160173

(51) Int. Cl.
B65D 41/04 (2006.01)
(52) U.S. Cl. ................................ 220/288; 220/DIG. 32; 220/DIG. 33; 220/304
(58) Field of Classification Search .......... 220/DIG. 32, 220/DIG. 33, 253, 288, 304
See application file for complete search history.

(56) References Cited

U.S. PATENT DOCUMENTS

| | | | | |
|---|---|---|---|---|
| 6,568,553 | B2 * | 5/2003 | Hagano et al. | 220/304 |
| 6,763,966 | B2 * | 7/2004 | Harris | 220/293 |
| 7,278,547 | B2 * | 10/2007 | Hagano et al. | 220/304 |
| 7,290,673 | B2 * | 11/2007 | Hagano | 220/288 |
| 7,380,681 | B2 * | 6/2008 | Reutter | 220/203.27 |
| 7,487,879 | B2 * | 2/2009 | Yoshida et al. | 220/304 |
| 2002/0066734 | A1 * | 6/2002 | Harris | 220/304 |
| 2004/0000553 | A1 * | 1/2004 | Ueki | 220/293 |
| 2004/0239049 | A1 * | 12/2004 | Hagano et al. | 277/628 |
| 2004/0256392 | A1 * | 12/2004 | Hagano et al. | 220/304 |

FOREIGN PATENT DOCUMENTS

| | | |
|---|---|---|
| JP | 58-7538 | 2/1983 |
| JP | 63-20218 | 1/1988 |
| JP | 5-85425 | 12/1993 |
| JP | 2510168 | 6/1996 |
| JP | 3075255 | 8/2000 |
| JP | 2003-104418 | 4/2003 |
| JP | 2003-160160 | 6/2003 |

* cited by examiner

*Primary Examiner*—Anthony Stashick
*Assistant Examiner*—Christopher B McKinley
(74) *Attorney, Agent, or Firm*—William L. Androlia; H. Henry Koda

(57) ABSTRACT

This invention provides a fuel filler cap that can release an outer cap from an inner cap without influences of direction of the external force when it applied. The fuel filler cap 1 comprises the outer cap 11 constructed by an upper face portion 112, a skirt portion 113 extending from the outer circumference of the upper face portion 112 and a plurality of wedge-shaped projection 111 formed on the inner face of the skirt portion 113; the pressing plate 15; and the inner cap 13 constructed by a supporting plate 14 having an annular slant 142, a seal ring 12 and annular groove 146 defined by the lower face of the pressing plate 15 laid over the supporting plate 14 and by the annular slant 142.

7 Claims, 15 Drawing Sheets

FUEL FILLER CAP

BACKGROUND OF THE INVENTION

1. Field of the Invention

The present invention relates to a fuel filler cap for closing the filler port of an automobile.

2. Description of the Related Art

The fuel filler cap is desired to exhibit a stable gastightness when it is closed. Particularly, the fuel filler cap is required not to release its closed state accidentally even where either a direct external force or an external force resulting from a deformation of a car body applied. In the prior art, therefore, there has been proposed the fuel filler caps, which includes an inner cap to be fitted in the filler port and an outer cap to cover the filler port and to thereby perform a turning operation of the fuel filler cap. In these fuel filler caps including the inner cap and the outer cap, it is adopted construction to secure gastightness in that the outer cap is released from the inner cap while leaving the inner cap in its closed state in the filler port where the external force applied thereto.

For example, the fuel filler caps disclosed in JP-B-58-007538, JP-B-05-085425 and Japanese Patent No. 2,510,168 have adopted the aforementioned releasing construction under concern of the case in that the external force is applied upwardly to force the outer cap open by an imperfection based on the operator's handling and by a deformation of the car body generated.

On the contrary, the fuel filler caps disclosed in JP-A-63-020218, Japanese Patent No. 3,075,255 and JP-A-2003-104418 have adopted the aforementioned releasing construction under concern of the cases in that the external force is applied to the fuel filler cap in a transverse or upward direction. On the other hand, the fuel filler caps disclosed in JP-A-2003-104418 and JP-A-2003-160160 have adopted the construction, in which an outer circumference pipe having an outer cap protecting function is released from the outer cap to prevent the inner cap pushed into the filler port when the external force is applied downward to the fuel filler cap.

In this respect, the fuel filler caps disclosed in JP-A-63-020218 and Japanese Patent No. 3,075,255 has a structure, in which the outer cap is released when a part of supporting the outer cap to the inner cap is partially broken. This makes it impossible to mount the released outer cap again on the inner cap. Thus, the entire fuel filler cap has to be replaced once the outer cap is released. Moreover, the fuel filler caps disclosed in JP-A-2003-104418 and JP-A-2003-160160 require a large member, e.g., a side wall defined in the references, that can resist against the external force, as its element. As a result, problems arise to increase the number of members and/or to make a size of the fuel filler cap larger.

Thus, the inventors have made investigations to develop a fuel filler cap having a construction, firstly, in that the outer cap is released from the inner cap where an external force that damages the gastightness of the cap is applied from any directions and, secondly, a construction in that the released outer cap, or the released parts, can be reused.

SUMMARY OF THE INVENTION

As a result of the investigations, the inventors have developed a fuel filler cap comprising: an inner cap of a substantially cylindrical member; and an outer cap of a cover member mounted on the inner cap: wherein the outer cap includes an upper face portion having a circular shape, a skirt portion integrally extending downward from an outer circumference of the upper face portion, and a plurality of a wedge-shaped projection having a triangular section formed circumferentially intermittently on an inner face of the skirt portion; wherein a pressing plate is a member having a circular shape, as viewed in a top plan, and having a smaller diameter than the internal diameter of the skirt portion; wherein the inner cap includes a supporting plate having a circular shape, as viewed in a top plan, and having an annular slant formed radially downward by chamfering a peripheral edge of an upper face thereof, a seal ring fitted between a lower face of the supporting plate and an outer face of an inner cap body, and an annular groove defined by a lower face of the pressing plate laid over the supporting plate and by the annular slant of the supporting plate; wherein the outer cap and the pressing plate are provided with a cap engagement means for engaging in a closing direction of the fuel filler cap; and wherein the pressing plate and the supporting plate are provided with a plate engagement means for turning integrally in an opening/closing direction of the fuel filler cap and for releasing an engaged state of the pressing plate with the supporting plate when a releasing load is applied upward to the pressing plate.

In the fuel filler cap of the present invention, the outer cap is mounted on the inner cap by fitting the wedge-shaped projections formed on the inner face of the skirt portion of the outer cap in the annular groove formed in the inner cap. The specific annular groove and the wedge-shaped projections are preferred to have the following structures.

The annular groove is formed by closing the annular slant formed continuously in the circumferential direction on the peripheral edge of the upper face of the supporting plate with the flat pressing plate. These annular groove has such a triangular shape as is determined by the sloping angle and width of the radially outward annular slant formed on the supporting plate and by the outer shape and size of the pressing plate with respect to the supporting plate. The sloping angle of the annular slant may be acute.

The wedge-shaped projections may be fitted in the annular groove. For example, the wedge-shaped projections may have either a sharper triangular section than the sectional shape of the annular groove, or a sectional trapezoidal shape having chamfered nose to be fitted. However, the fitting of the wedge-shaped projections in the annular groove determines the stability of mounting the outer cap on the inner cap. Therefore, the individual wedge-shaped projections are desired to have a section identical or similar to that of the annular groove. Moreover, the number of the wedge-shaped projections is arbitrary, but it is preferred that the individual wedge-shaped projections are equidistantly arranged in the circumferential direction with the equal size in the wedge-shaped projections.

Here are considered the case, in which the annular groove and the wedge-shaped projections have the identical sectional shape. At first, when a downward external force is applied to the outer cap, the wedge-shaped projections slide down along the annular slant forming the annular groove, to widen the diameter of the skirt portion thereby to release the fitting engagements between the annular groove and the wedge-shaped projections, so that the outer cap leaves the inner cap. The wedge-shaped projections have to be transversely displaced with respect to the axis of the outer cap so that the wedge-shaped projections may slide down along the annular slant. These displacements are realized by giving to the skirt portion of the outer cap elasticity or flexibility. By setting the length of the skirt portion appropriately longer, moreover, an excessive external force can be prevented from being transmitted to the inner cap when the external force is applied to the outer cap. Concretely, the length of the skirt portion may be so determined that the lower edge of the skirt portion may abut against the car body face when the external force is applied to the outer cap while the fuel filler cap is being secured in the filler port, thereby to prevent the upper face portion of the outer cap from reaching the pressing plate. Thus, the skirt portion also acts as a closing guide or the like to guide the fuel filler cap into the filler port thereby to contribute to an improvement of the operability of the fuel filler cap.

Next, in case the transverse external force is applied to the outer cap, the wedge-shaped projections in the fitted state are pushed up at first along the annular slant of the supporting plate. When the wedge-shaped projections apply a releasing load or greater to the pressing plate, the pressing plate is released from the supporting plate to release the fitted state between the annular groove and the wedge-shaped projections. Thus, the outer cap leaves the inner cap. Here, the "releasing load" defines an upward load applied to the supporting plate that can release the engagement between the supporting plate and the pressing plate. Likewise, when an upward external force is applied to the outer cap, the raised wedge-shaped projections apply the releasing load or greater to the pressing plate so that the pressing plate is released from the supporting plate thereby to release the fitting relations between the annular groove and the wedge-shaped projections. Thus, the outer cap leaves the inner cap.

Thus, in the fuel filler cap of the present invention, only the outer cap leaves the inner cap in case the downward external force is applied to the outer cap while the gastightness by the inner cap being kept, and the outer cap and the pressing plate leave the inner cap in case the transverse or upward external force is applied to the outer cap. Therefore, the restoration of the fuel filler cap can be easily achieved if the individual members are mounted or engaged again. Specifically, the pressing plate and the outer cap partially released from the inner cap are once completely released from the inner cap. And then, the pressing plate is removed from the outer cap. The pressing plate thus removed is brought into engagement with the supporting plate to form the annular groove again. The restoration of the fuel filler cap can be achieved in order that the outer cap covers the pressing plate engaged with the supporting plate to fit the wedge-shaped projections having the lower face slanted into the annular groove.

The plate engagement means for keeping the supporting plate and the pressing plate integral has to release the engagement of these two plates in case the releasing load or greater is applied to the pressing plate. Therefore, the plate engagement means in the present invention is constructed by a plurality of an engaging projection projecting upward from the upper face of the supporting plate, and a plurality of an engaging hole formed in the pressing plate. The engaging projection may be constructed by a hook portion integrally formed on the top end of a projection body having elasticity and to thereby engage the hook portion to the peripheral edge of the engaging hole by inserting the engaging projections through the engaging holes. As a result, the plate engagement means can be achieved that the engagement between the hook portion and the peripheral edge of the engaging hole is to be released in case that a releasing load or greater is applied upwardly.

Moreover, the relation between the engaging projection and the engaging hole may be revered to provide another plate engagement means. Specifically, this plate engagement means may be constructed by a plurality of the engaging projection projecting downward from the lower face of the supporting plate, and a plurality of the engaging hole formed in the supporting plate. The engaging projection includes the hook portion integrally formed on the bottom end of the projection body having elasticity. This engaging projection engages its hook portion to the peripheral edge of the engaging hole by being inserted throughout the engaging hole. As a result, the plate engagement means can be achieved that the engagement between the hook portion and the peripheral edge of the engaging hole is to be released in case that a releasing load or greater is applied upwardly.

In the fuel filler cap of the present invention, the supporting plate and the pressing plate are integrally turned by the plate engagement means, and the pressing plate and the outer cap are integrally turned by the cap engagement means. Thus, the opening/closing operation of the inner cap by the outer cap is realized through the pressing plate. Here, in case the invention is applied to a screw-type fuel filler cap, it is desired for preventing the excessive crush of the seal ring to provide a torque restricting means for turning the outer cap idly with respect to the inner cap. In this case, the present invention can realize the torque restricting means by utilizing the cap engagement means.

Specifically, the cap engagement means includes a plurality of a ratchet pawl elastically supported on an upper face of the pressing plate and a plurality of a ratchet arranged annularly either on the inner face of the upper face portion of the outer cap or on the inner face of the skirt portion. The ratchet pawl is formed on a supporting arm having elasticity. The ratchet pawl and the ratchet never fail to engage in an opening direction of the fuel filler cap, and engage in a closing direction of the fuel filler cap in case a substantially less than idling allowing the supporting arm not to be elastically deformed is applied. The ratchet pawl and the ratchet, however, release the engagement and turn the outer cap idly in case the idling load or greater allowing the supporting arm to be elastically deformed is applied. In this manner, this type of the fuel filler cap may be constructed to turn the outer cap idly in case the idling load or greater is applied in closing direction of the fuel filler cap.

The aforementioned relations between the ratchet pawl and the annular ratchet may be constructed in reverse. Specifically, the cap engagement means includes a plurality of a ratchet pawl elastically supported either on the inner face of the upper face portion of the outer cap or on the inner face of the skirt portion, and a plurality of a ratchet arranged annularly on the upper face of the pressing plate. The ratchet pawl is formed like the aforementioned example on the supporting arm having elasticity. The ratchet pawl and the ratchet never fail to engage in the opening direction of the fuel filler cap, and engage in the closing direction of the fuel filler cap in case that a substantially less than idling allowing the supporting arm not to be elastically deformed is applied. The ratchet pawl and the ratchet, however, release the engagement and turn the outer cap idly in case that the idling load or greater allowing the supporting arm to be elastically deformed is applied. In this manner, the fuel filler cap may be constructed to turn the outer cap idly in case that the idling load or greater is applied in closing direction of the fuel filler cap.

In addition, in the fuel filler cap for realizing the sealing properties by crushing the seal ring with respect to the upper edge of the filler port, the supporting plate may be used for crushing the seal ring. In other words, it may be constructed in that the supporting plate crushes the seal ring between the lower face of the supporting plate and the upper edge of the filler port while the fuel filler cap is secured in the filler port. In this case, the supporting plate also acts to guide the seal ring in certain position with respect to the inner cap. If the supporting plate and the seal ring are thus close to each other, the wedge-shaped projections of the outer cap to be slid down and contact to the seal ring by the downward load applied may cause to damage the seal ring. It is, therefore, advisable to provide the supporting plate with the annular pendulous portion to surround the seal ring.

The fuel filler cap of the present invention has advantageous effects of that, firstly, the outer cap be applied the external force can be released from the inner cap of fitting in the filler port, in order to secure the gastightness by the inner cap under any directions of the external force applied to the outer cap. Secondly, in addition, the outer cap is not accompanied by a partial breakage so that the fuel filler cap of the invention can reuse the outer cap or the pressing plate released.

The aforementioned individual advantageous effects come from the construction, in which the wedge-shaped projections of the outer cap are fitted in the annular grooves formed by the supporting plate and the pressing plate. In case the outer cap receives the downward external force, the wedge-shaped projections slide down along the annular slant of the annular groove so that the plate engagement means is released to release the inner cap from the outer cap. In case the outer cap receives the transverse or upward external force, on the other hand, the wedge-shaped projections push up the pressing plate with the releasing load or greater thereby to release the plate engagement means thereby to release the inner cap from the outer cap. In either case, accordingly, the fuel filler cap of the present invention can be easily reconstructed by fitting the wedge-shaped projections again in the annular groove, because of the simple construction for releasing the fitting between the annular groove and the wedge-shaped projections.

The plate engagement means provides a first advantageous effect to release the outer cap from the inner cap, in case the outer cap receives the transverse or upward direction while the supporting plate and the pressing plate are integrally turned in the opening/closing direction of the fuel filler cap. The plate engagement means composed of the engaging projections and the engaging holes respectively assigned to the supporting plate and the pressing plate can be easily manufactured and also can adjust the adequate releasing load by setting the structure or number of the engaging projections and the engaging holes. Thus, the plate engagement means composed of the engaging projections and the engaging holes has an advantageous effect to set the amount of the external force releasing the outer cap from the inner cap by utilizing the engaging relations between the engaging projections and the engaging holes against the downward or transverse external force forcing the inner cap open.

The cap engagement means provides a first advantageous effect to release the outer cap from the inner cap, in case the outer cap receives the downward direction while the pressing plate and the outer cap are integrally turned in the opening/closing direction of the fuel filler cap. Here, the cap engagement means composed of the annular ratchets and the ratchet pawls respectively assigned to the pressing plate and the outer cap can be easily manufactured and also can adjust the amount of the torque restrictions adequately, in addition to the first advantageous effect of the invention. In other words, the fitting relation between the annular groove and the wedge-shaped projections has an advantageous effect to set the amount of the external force releasing the outer cap from the inner cap against the downward external force for pushing the inner cap.

Thus, the supporting plate provides a base for releasing the outer cap from the inner cap. In addition, the supporting plate is positioned just above the seal ring so that it can be utilized as the portion to crush the seal ring. This structure contributes to the reduction of the number of parts. Moreover, this supporting plate appears that the supporting plate radially extends with respect to the seal ring. In other words, the supporting plate also acts to protect the seal ring against contacting with the wedge-shaped projections that slide down in case the outer cap receives the downward external force. Further, to form the annular pendulous portion of the supporting plate surrounding the seal ring has the advantageous effect to protect the seal ring more reliably against contacting with the wedge-shaped projections.

BRIEF DESCRIPTION OF THE DRAWINGS

FIG. 3 is a partially enlarged view of a portion encircled in FIG. 2 taken in the direction of arrow 14a;

DETAILED DESCRIPTION OF THE INVENTION

Figure 1:
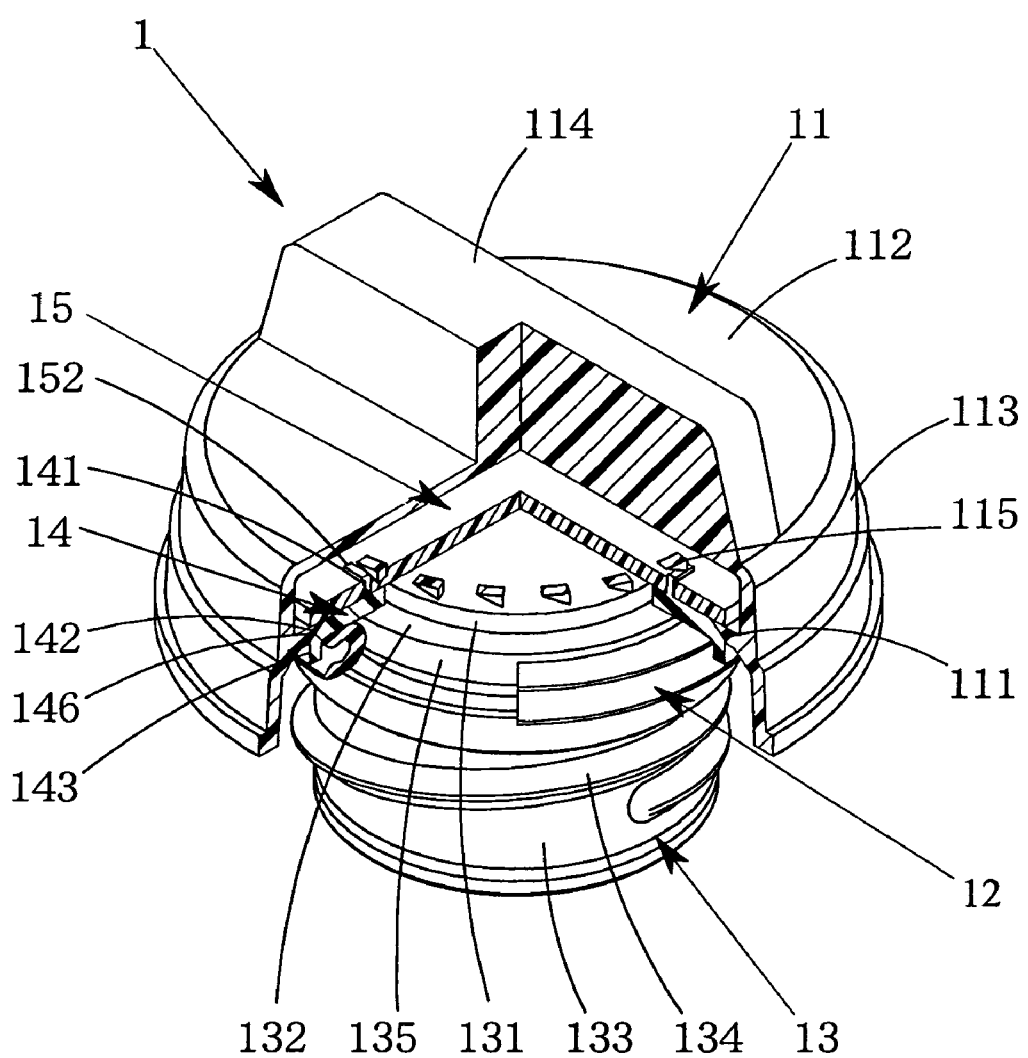
FIG. 1 is a partially broken perspective view of a screw-type fuel filler cap according to the present invention.

Embodiments of the invention will be described with reference to the accompanying drawings. A torque restricting function in an opening/closing direction is usually applied to a screw-type fuel filler cap 1. Thus, this screw-type fuel filler cap 1 is shown in the individual drawings.

The embodiment is directed to the screw-type fuel filler cap 1 for realizing the sealing properties by pushing and crushing a seal ring 12 to the upper edge of a filler port 2, as shown in FIG. 1 to FIG. 5. Specifically, the fuel filler cap 1 is basically composed of: an inner cap 13 made of a resin into a substantially cylindrical member and fitted on the outer face of the seal ring 12; and an outer cap 11 made of a resin into a cover member and fitted on the inner cap 13. Moreover, the entire fuel filler cap of this embodiment is further constructed by laying a pressing plate 15 made of a resin into a circular outer shape in a top plan view, on a supporting plate 14 mounted on the inner cap 13.

The inner caps 13 is composed of: an inner cap body 133 having an annular mounting base 132 formed around a positioning protrusion 131 protruding upward; and the annular supporting plate 14 fitted and mounted on the positioning protrusion 131 of the inner cap body 133. The inner cap 13 of this embodiment includes: a pair of external threads 134 formed at centrally symmetric positions on its outer face for engaging with the internal thread 21 of the filler port 2; and a fitting circumferential face 135 formed at the upper location of the external threads 134 and having a width corresponding to the thickness of the seal ring 12. This seal ring 12 is fitted on the fitting circumferential face 135. The seal ring 12 of this embodiment is formed to have a C-shaped section opening outwardly, but it may apply a solid seal ring having a circular section because the actions and effects of the invention are not influenced by the structure of the seal ring.

The supporting plate 14 is an annular member made of a resin having a size of the configuration shaped in a circular top plan view sufficient to cover the seal ring 12. This supporting plate 14 is adhered by fitting to the positioning protrusion 131 arranged at the upper portion of the inner cap body 133. The positioning protrusion 131 is formed in a circular shape in a top plan view and a thickness equal to that of the supporting plate 14. The individual top faces of the positioning protrusion 131 and the supporting plate 14 are flush with each other. The adherence means of the supporting plate 14 to the inner cap body 133 is exemplified by a variety of known means such as a screwing, a cementing, and so on.

The supporting plate 14 of this embodiment is provided with: four engaging projections 141 projecting upward from the upper face thereof and arranged at equal intervals in the circumferential direction; and an annular slant 142 formed downward in the circumferential direction descending radially outward by chamfering the peripheral edges of the upper faces of the engaging projections 141. Further, an annular pendulous portion 143 extending downwardly from the peripheral edge of the annular slant 142 to surround the seal ring 12 is provided. The engaging projections 141 are made to have a height corresponding to the thickness of the pressing plate 15 and are provided individually with a hook portion 145 projecting outward from the top end of the projection body 144, which has such an configuration in a top plan view as is partially cut out from the circumference. The annular pendulous portions 143 have a function to prevent from that the wedge-shaped projections 111 might damage the seal ring 12 when the outer cap 11 is to be released from the inner cap 13 by a downward external force applied. In addition, the annular pendulous portions 143 have a further function as to reinforce the strength of the peripheral edge of the supporting plate 14, which is sharpened by forming the annular slant 142 downwardly.

Figure 6:
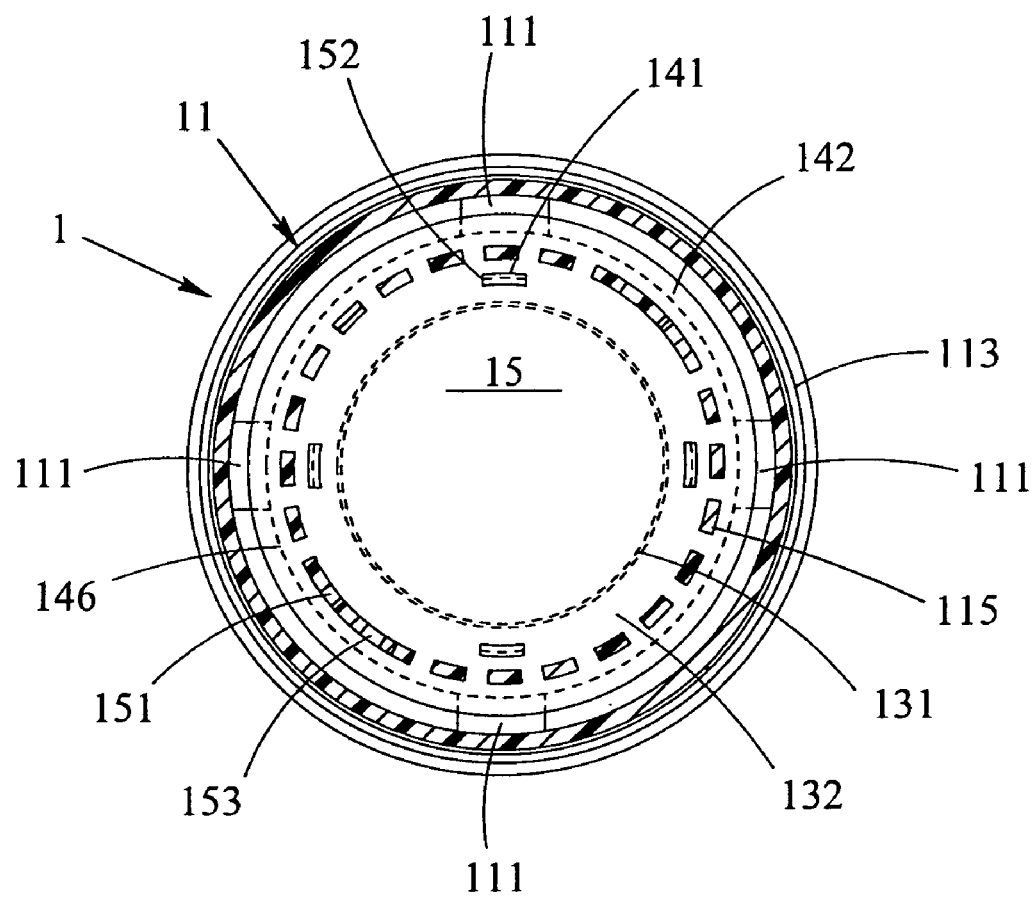
FIG. 6 is a section taken on line I-I in FIG. 5.

The outer cap 11 is a substantially frusto-conical cover member having a size for covering so far the portion as the seal ring 12 fitted on the inner cap 13. The outer cap 11 has a structure composed of an upper face portion 112 having a circular shape in a top plan view and an internal diameter larger than the outer diameter of the supporting plate 14, and a skirt portion 113 extending downward integrally from the outer circumference of the upper face portion 112. In this embodiment, the outer cap 11 is provided on its upper face portion 112 with a handle grip 114 for assisting the opening/closing operations, but the handle grip 114 can be dispensed with. The upper face portion 112 is integrally provided on its inner face with a plurality of a ratchet 115 formed and arranged projections intermittently in the annular direction (hereinafter referred to as annular ratchet), as shown in FIG. 6. This annular ratchet 115 constructs a cap engagement means together with a later-described ratchet pawl 151.

Figure 7:
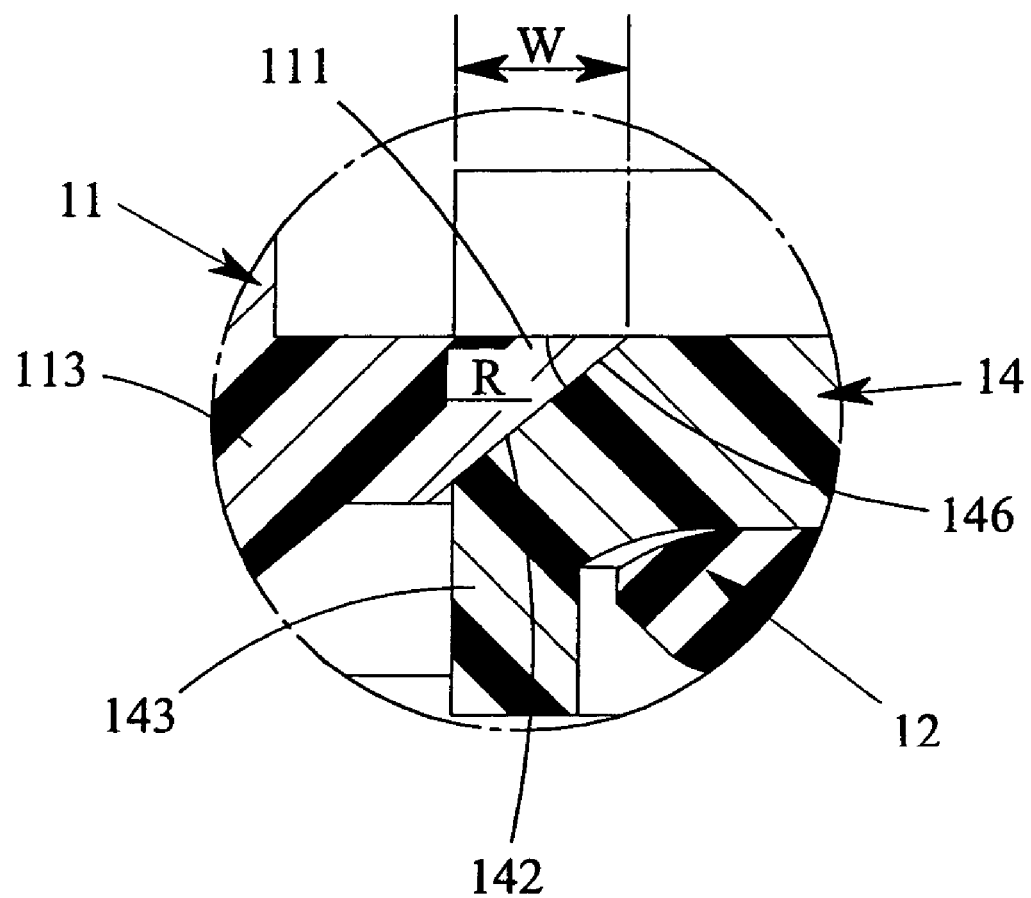
FIG. 7 is a partially enlarged view of a portion encircled in FIG. 5 taken in the direction of arrow II.

The skirt portion 113 is provided on its inner face with the four wedge-shaped projections 111, which project radially inward and arranged with equal intervals in the circumferential direction. The number of the wedge-shaped projections 111 is arbitrary but is desired at least two in a centrally symmetric relation. Preferably, three to six wedge-shaped projections may be arranged with equal intervals in the circumferential direction. The individual wedge-shaped projections 111 of this embodiment have a triangular sectional shape similar to the sectional shape of annular groove 146 defined by the annular slant 142 of the supporting plate 14 and the lower face of the pressing plate 15, as shown in FIG. 7. As shown in FIG. 6, moreover, the nose of the wedge-shaped projections 111 has a curving shape in the top plan view corresponding to the shape of the peripheral edge of the annular groove 146.

The pressing plate 15 is a plate-shaped resin member having a circular shape in a top plan view identical to the outer shape of the supporting plate 14. The pressing plate 15 is provided in its surface with four engaging holes 152, which are arranged with equal intervals in the circumferential direction and at the same positional relation as that of the engaging projections 141 arranged on the supporting plate 14. This pressing plate 15 is laid over the supporting plate 14 by inserting the engaging projections 141 of the supporting plate 14 into the engaging holes 152 such that the hook portions 145 of the individual engaging projections 141 are engaged on the peripheral edges of the engaging holes 152. Thus, the pressing plate 15 is supported stable by utilizing the positioning protrusion 131 of the inner cap 13 and the supporting plate 14 as a result of that the plate engagement means composed of the engaging projections 141 and the engaging holes 152 constructs close integral relation with the supporting plate 14. Here, the number of the engaging projections 141 and the engaging holes 152 is arbitrary, and, although not shown, the number of the engaging holes 152 may be larger than that of the engaging projections 141, as long as the engaging projections 141 engage with the engaging holes 152 correspondingly.

A pair of the ratchet pawls 151 is provided at centrally symmetric positions of the upper face of the pressing plate 15, and to construct the cap engagement means for realizing the torque restricting function together with the aforementioned annular ratchets 115 of the outer cap 11. The ratchet pawls 151 in this embodiment have a shape curved in a manner to correspond to the arranged direction of the annular ratchets 115 as viewed in a top plan view, and are arranged at the top ends of supporting arms 153 formed by notching the upper face of the pressing plate 15 and lift them up to thereby display elasticity. The cap engagement means engage the annular ratchets 115 and the ratchet pawls 151 completely in the opening direction of the fuel filler cap 1 thereby to transmit the turning operation of the outer cap 11 from the pressing plate 15 to the inner cap 13 through the supporting plate 14. In case a substantially less than idling load allowing the supporting arm not to be elastically deformed is applied in the closing direction of the fuel filler cap 1, the annular ratchets 115 and the ratchet pawls 151 are engaged to transmit the turning operation of the outer cap 11 to the inner cap 13. When an idling load or greater allowing the supporting arm to be elastically deformed is applied, on the other hand, the annular ratchets 115 bend the supporting arm 153 thereby to push down the ratchet pawls 151 so that the engagement comes off.

As a result, the turning operation of the outer cap 11 is not transmitted to the inner cap 13 thereby to turn the outer cap 11 idly. The torque thus restricted is determined by the elasticity of the supporting arm 153.

In the fuel filler cap 1 of the present invention, the outer cap 11 is mounted on the inner cap 13 by fitting the wedge-shaped projections 111 formed on the inner face of the skirt portion 113 into annular groove 146 formed by laying the pressing plate 15 over the supporting plate 14 having the annular slant 142. Accordingly, the mounting stability of the outer cap 11 to the inner cap 13 depends on the fitting relation of the wedge-shaped projections 111 to the annular groove 146. At this time, the positional relation of the wedge-shaped projections 111 in the circumferential direction to the annular groove 146 is arbitrary. The annular groove 146 is continuously formed in the circumferential direction so that the wedge-shaped projections 111 can run along the annular groove 146 when the outer cap 11 turns idly. Moreover, the sectional shapes of the annular groove 146 and the wedge-shaped projection 111 are formed in identical so that the mounting stabilities of the outer cap 11 and the inner cap 13 can be secured against the external force applied from any directions, as shown in FIG. 7. Furthermore, it is advisable that a depth W of the annular groove 146 is set around several millimeters, and that an angle R of inclination of the annular slant 142 may also set in acute, in order to enable the stable release of the outer cap 11 from the inner cap 13.

Figure 5:
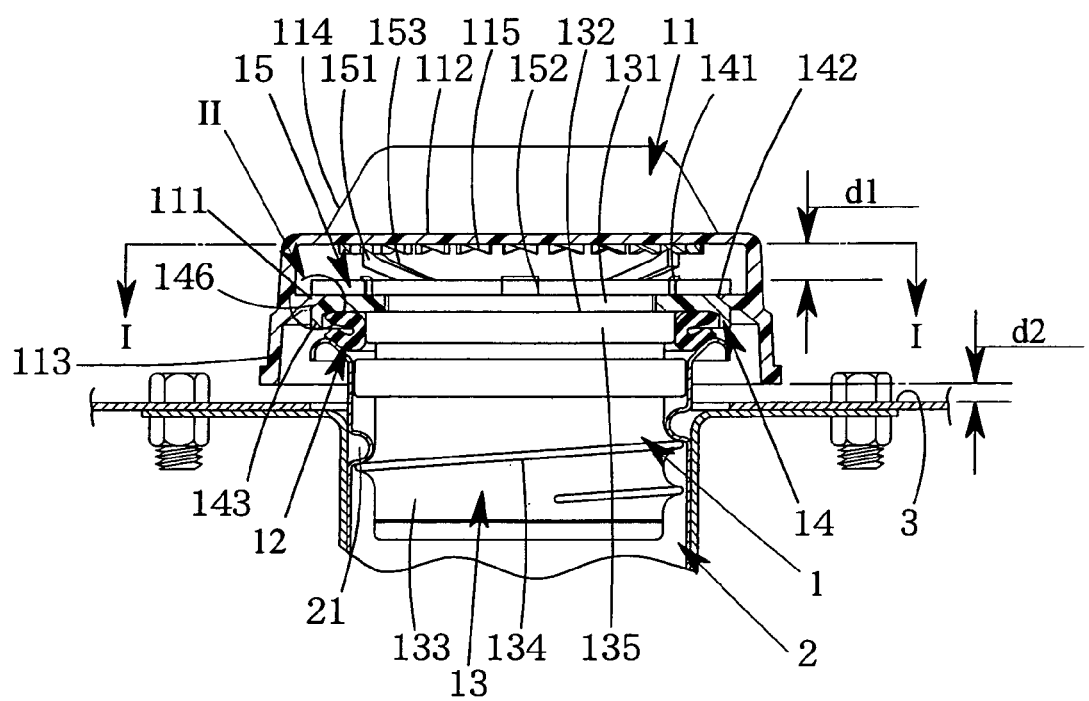
FIG. 5 is a partially sectional view showing the state, in which the fuel filler cap is secured in a filler port.

Under the condition of that the fuel filler cap 1 is secured with the filler port 2, moreover, it is advisable that the length of the skirt portion 113 is set longer, in order to improve the operability of the fuel filler cap 1 while preventing an excessive transmission of the external force from the outer cap 11 to the inner cap 13. In this embodiment, as shown in FIG. 5, the length of the skirt portion 113 is determined so that, in the secured state of the fuel filler cap 1, a distance d1 from the lower face of the upper face portion 112 of the outer cap 11 to the upper face of the pressing plate 15 is to be longer than the distance d2 from the lower edge of the skirt portion 113 to a car body face 3.

The fuel filler cap 1, as shown in FIGS. 1 to 4, adopts the construction to mount the outer cap 11 to the inner cap 13, in the manner that the outer cap 11 is mounted by laying the pressing plate 15 over the supporting plate 14 of the inner cap 13 thereby to integrate them by the plate engagement means and then by fitting the wedge-shaped projections 111 in the annular grooves 146 defined by the annular slants 142 of the supporting plate 14 and by the lower face of the pressing plate 15. This fuel filler cap 1 is secured by fitting the inner cap 13 in the filler port 2 and by turning the outer cap 11 in the closing direction. In the same time, as shown in FIG. 5, this fuel filler cap 1 realizes the sealing properties by that the supporting plate 14 pushes and crushes the seal ring 12 on the upper edge of the filler port 2. By turning the outer cap 11 in the opening direction from that secured state of the fuel filler cap 1, on the other hand, the fuel filler cap 1 can be released from the filler port 2. As described above, the fuel filler cap 1 of the invention has no particular difference in its ordinary use from that of the prior art.

Figure 8:
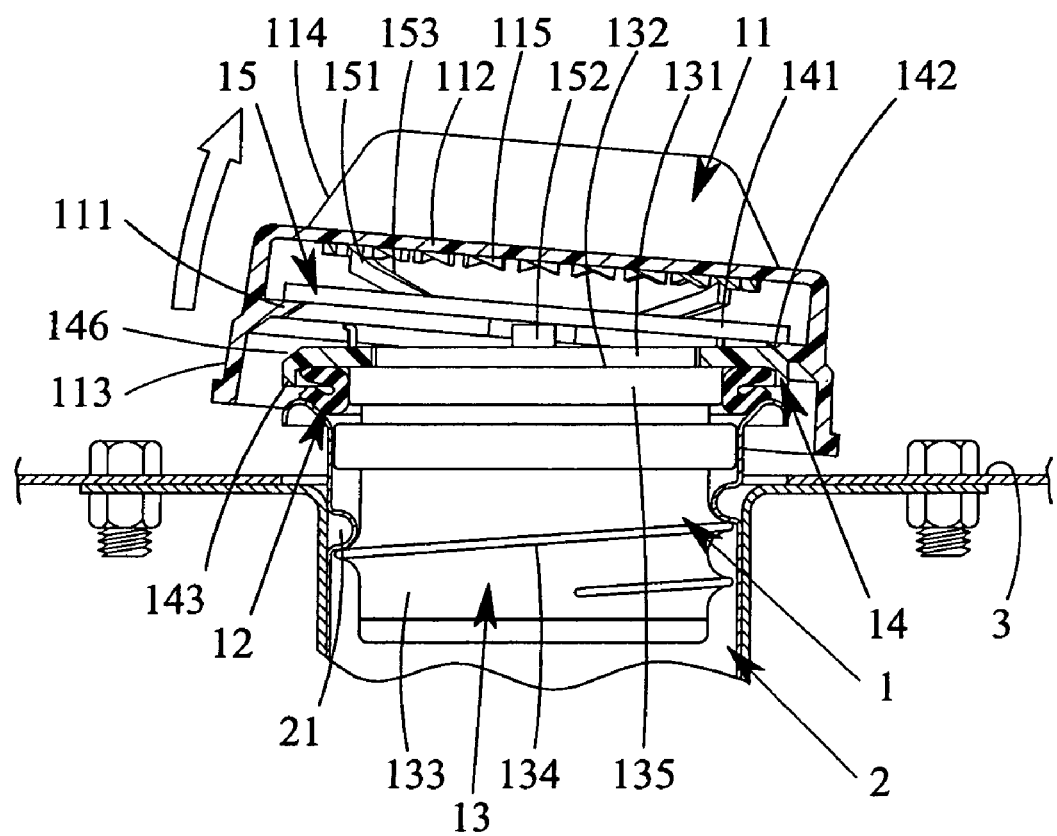
FIG. 8 is a partially sectional view corresponding to FIG. 5 for explaining the release of an outer cap in case an outer cap receives a transverse or upward external force.

When an external force is transversely applied to the outer cap 11 of the fuel filler cap 1 in the aforementioned secured state, the wedge-shaped projections 111 are pushed up along the annular slant 142 of being one of the elements forming the annular groove 146. When these wedge-shaped projections 111 apply a releasing load or greater upward to the pressing plate 15, they release the pressing plate 15 from the supporting plate 14 thereby to release the fitting relations between the annular groove 146 and the wedge-shaped projections 111. Thus, the outer cap 11 is released from the inner cap 13, as shown in FIG. 8. When an external force is applied upward to the outer cap 11 of the fuel filler cap 1 in the secured state, the wedge-shaped projections 111 are directly pushed up to release the fitting relations between the annular groove 146 and the wedge-shaped projections 111 as above-described in when the external force is transversely applied, thereby to release the outer cap 11 from the inner cap 13. In either case, the external force is prevented by releasing the outer cap 11 from the inner cap 13 from being transmitted to the inner cap 13 and thereby to secure the sealing properties resulting from the crush of the seal ring 12.

Either of the releases of the outer cap 11 is provided by the release of the plate engagement means so that not only the outer cap 11 but also the pressing plate 15 is not damaged. Moreover, the pressing plate 15 left from the supporting plate 14 is still received in the outer cap 11 with the interference of the wedge-shaped projections 111 so that the pressing plate 15 stays in the condition being not easily to fall off. Thus, it further prevents from apprehension of loss of the pressing plate 15. According to this structure, the fuel filler cap 1 is easily enabled to reconstruct by laying the pressing plate 15 again over the supporting plate 14 thereby to be engaged with the plate engagement means and by fitting the wedge-shaped projections 111 again in the annular groove 146 formed.

Figure 9:
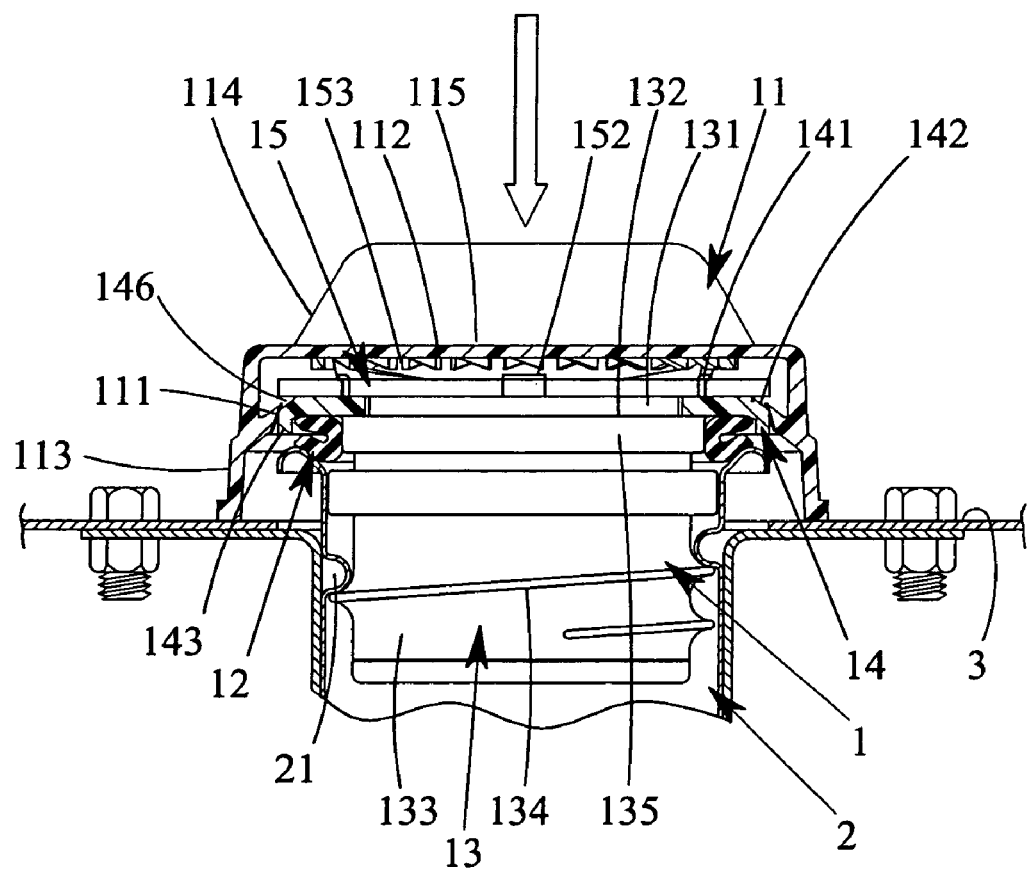
FIG. 9 is a partially sectional view corresponding to FIG. 5 for explaining the release of an outer cap in case an outer cap receives a downward external force.

When the external force is applied downward to the outer cap 11 of the fuel filler cap 1 in aforementioned secured state, the wedge-shaped projections 111 slide down along the annular slant 142 forming annular groove 146, with the skirt portion 113 being elastically deformed, so that the outer cap 11 comes off from the annular groove 146. Thus, the outer cap 11 leaves the inner cap 13, as shown in FIG. 9. Here, if the length of the skirt portion 113 is set as described above, when the external force applied, the lower edge of the skirt portion 113 abuts against the car body face 3 so that the external force is prevented from being transmitted from the outer cap 11 to the inner cap 13 thereby to maintain the sealing properties resulting from the crush of the seal ring 12. Moreover, in this embodiment, the pressing plate 15 is kept in engagement with the supporting plate 14 by the engagement means. Therefore, the outer cap 11 is once removed from the inner cap 13 completely in order to fit the wedge-shaped projections 111 again to the annular groove 146 properly, so that the fuel filler cap 1 can be easily reconstructed.

The fuel filler cap of the invention may be constructed to fit the outer cap provided with the wedge-shaped projections to the inner cap provided with the annular groove. With these certain constructions of the outer/inner caps, accordingly, it is not so important how the plate engagement means and the cap engagement means are constructed. Moreover, the constructions of the supporting plate and the pressing plate are also not restricted to those of the foregoing embodiment. FIGS. 10 to 15 are perspective views corresponding to FIG. 2 but show the extractions of the portions different from those of the embodiment shown in FIGS. 1 to 9.

Figure 10:
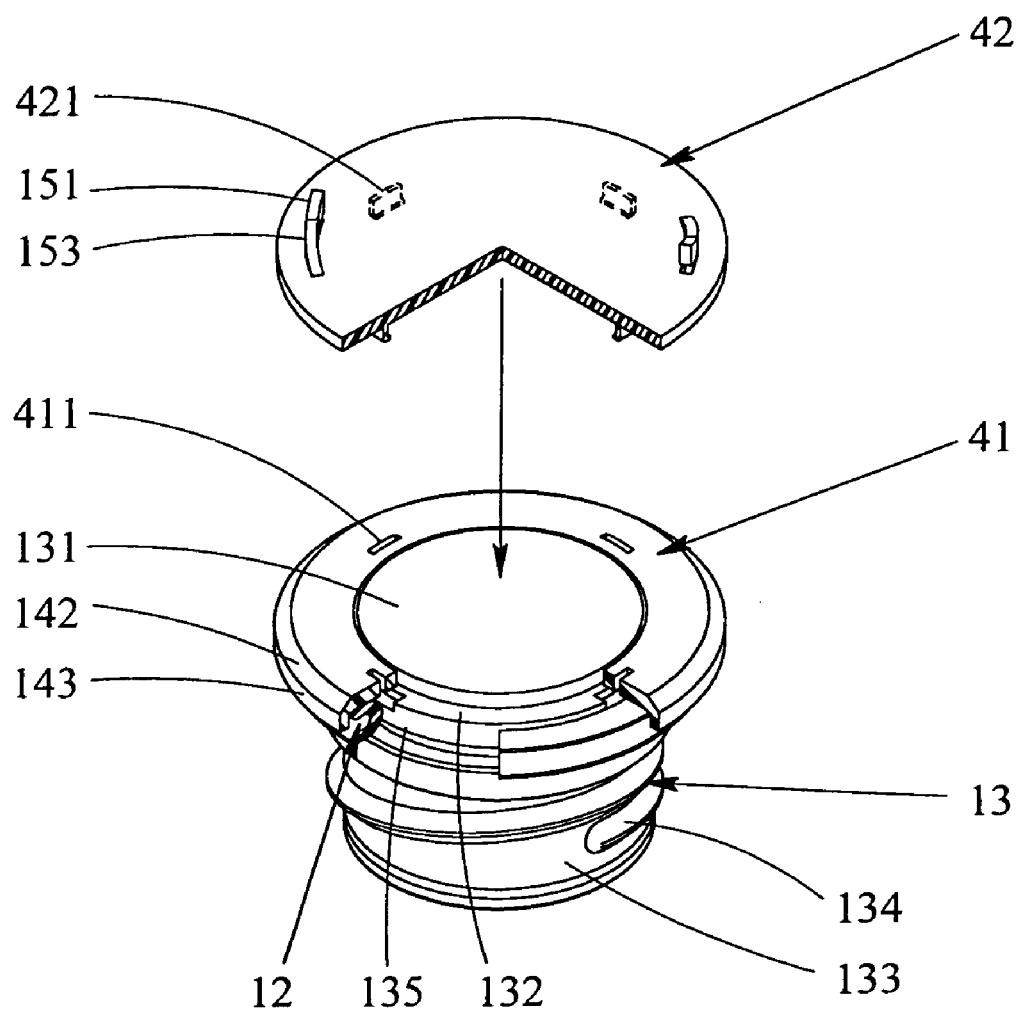
FIG. 10 is a perspective view extracted a pressing plate and an inner cap corresponding to FIG. 2 but shows the reversed relation of engaging projections and engaging holes both composing plate engagement means.

The plate engagement means may determine the amount of the external force for releasing the outer cap from the inner cap 13 while realizing the integration between the supporting plate and the pressing plate. Accordingly, the plate engagement means engaging the engaging holes 411 and the engaging projections 421 may be constructed in that the supporting plate 41 is provided with four engaging holes 411 arranged with equal intervals in the circumferential direction and the pressing plate 42 is provided on the lower face thereof with four engaging projections 421 arranged with intervals corresponding to that of the individual engaging holes 411, as shown in FIG. 10.

Figure 11:
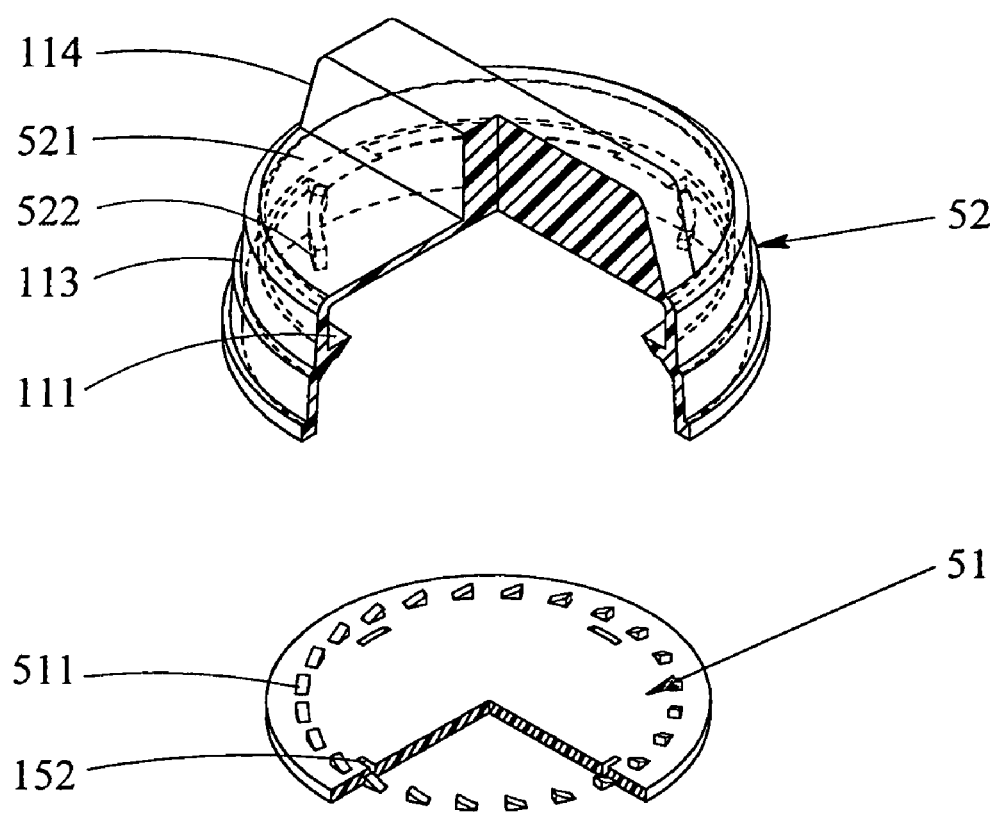
FIG. 11 is a perspective view extracted the outer cap and the pressing plate corresponding to FIG. 2 but shows the reversed relation between annular ratchets and ratchet pawls composing a cap engagement means.

Likewise, the cap engagement means may be constructed to transmit the turning operation of the outer cap to the supporting plate thereby to preferably restrict the torque in the closing direction of the fuel filler cap. As shown in FIG. 11, for example, the cap engagement means including the torque restriction may be constructed by that a plurality of the annular ratchet 511 formed by arranging projections in the circumferential direction on the upper face of the pressing plate 51, and a pair of the ratchet pawls 522 arranged at centrally symmetric positions on the inner face of the upper face portion 521 of the outer cap 52. Moreover, although not illustrated, the cap engagement means may also be constructed by that a plurality of the annular ratchet formed by arranging the projections in the circumferential direction on the inner face of the skirt portion of the outer cap, and at least a pair of the ratchet pawls formed on the pressing plate radially outward to the annular ratchet of the skirt portion. Still further, the cap engagement means may be constructed by that the ratchet pawls formed on the inner face of the skirt portion of the outer cap radially inward, and the annular ratchets formed by arranging the projections to engage with the annular ratchet of the skirt portion on the upper face of the pressing plate in the circumferential direction.

Figure 2:
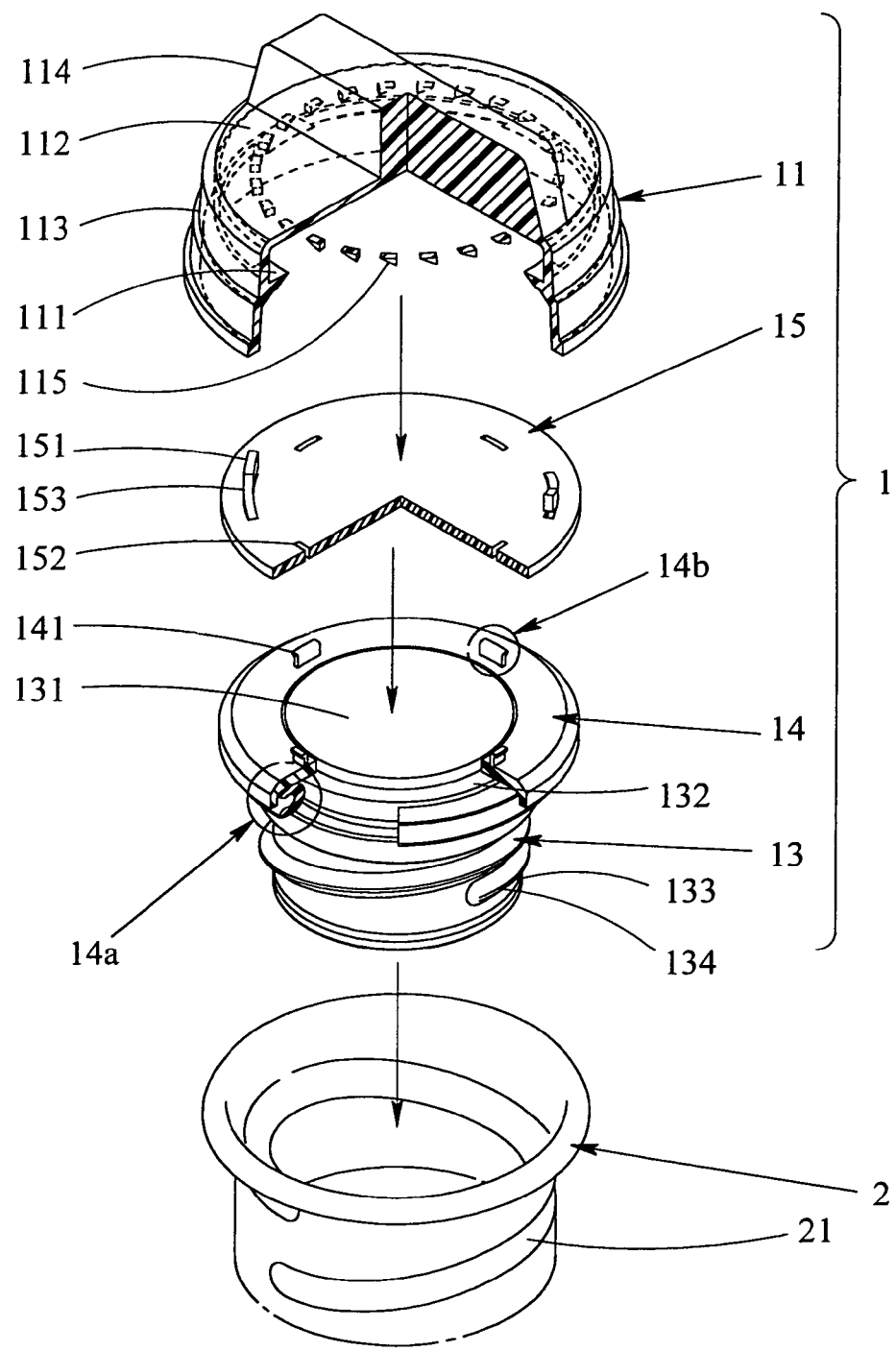
FIG. 2 is an exploded and partially broken perspective view of the essential portions of the same fuel filler cap.
Figure 3:
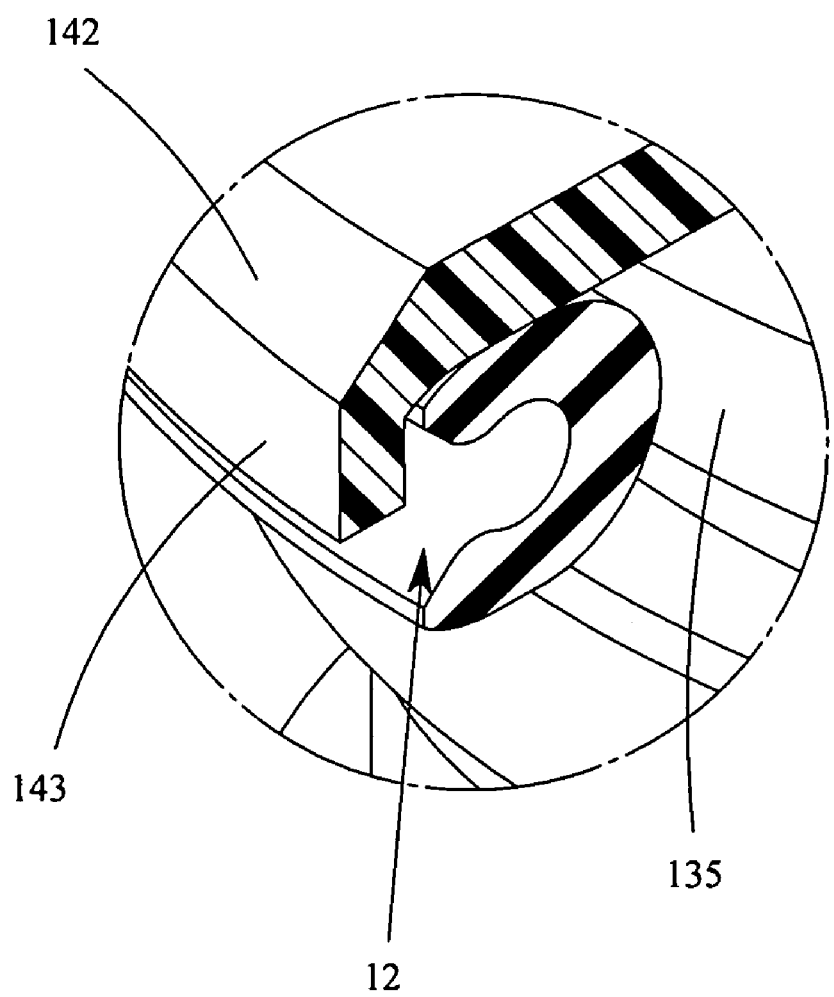
Figure 4:
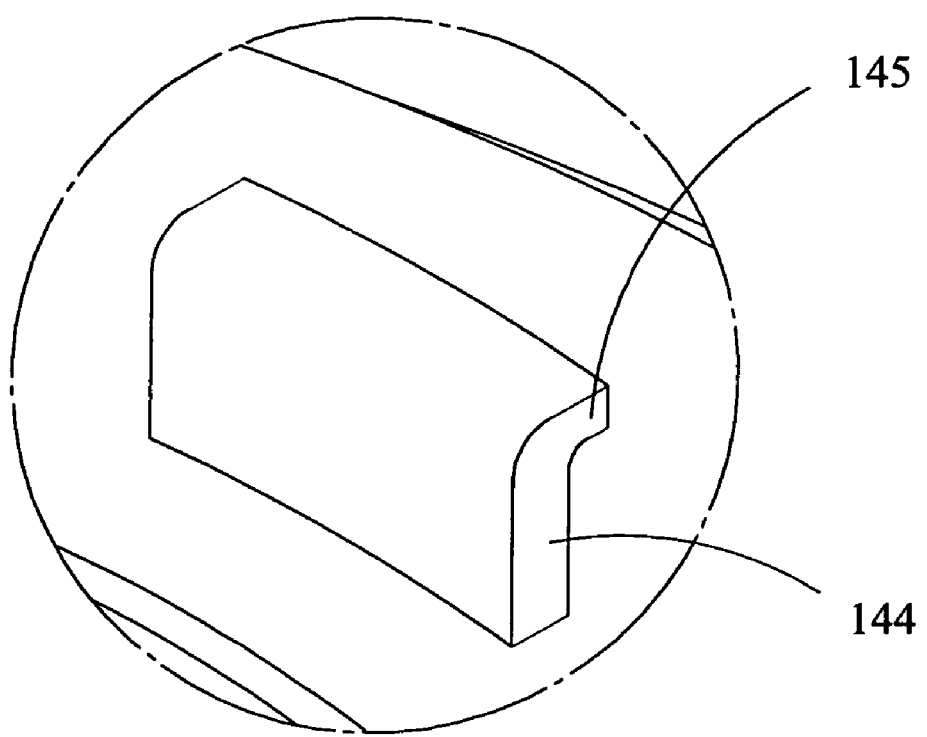
FIG. 4 is a partially enlarged view of a portion encircled in FIG. 2 taken in the direction of arrow 14b.
Figure 12:
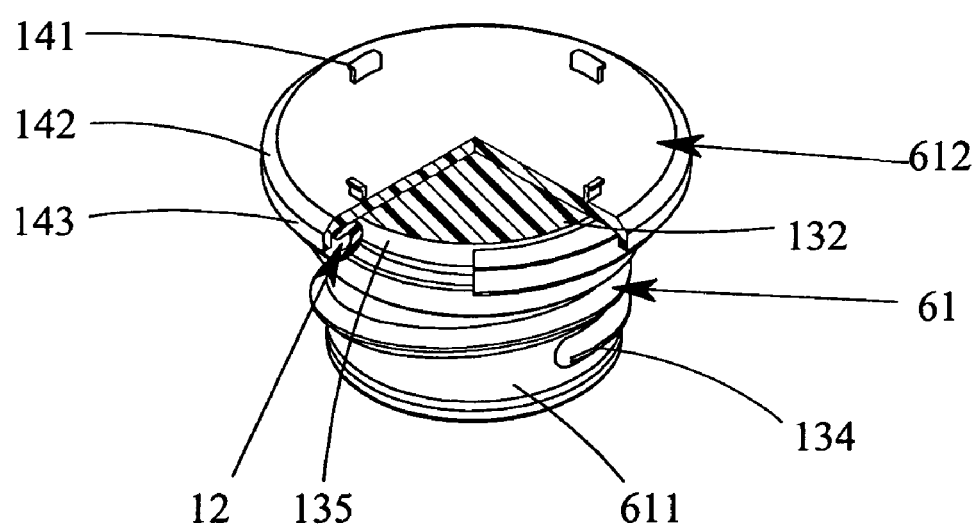
FIG. 12 is a perspective view extracted the inner cap corresponding to FIG. 2 shows a supporting plate of another embodiment formed integrally with an inner cap body.
Figure 13:
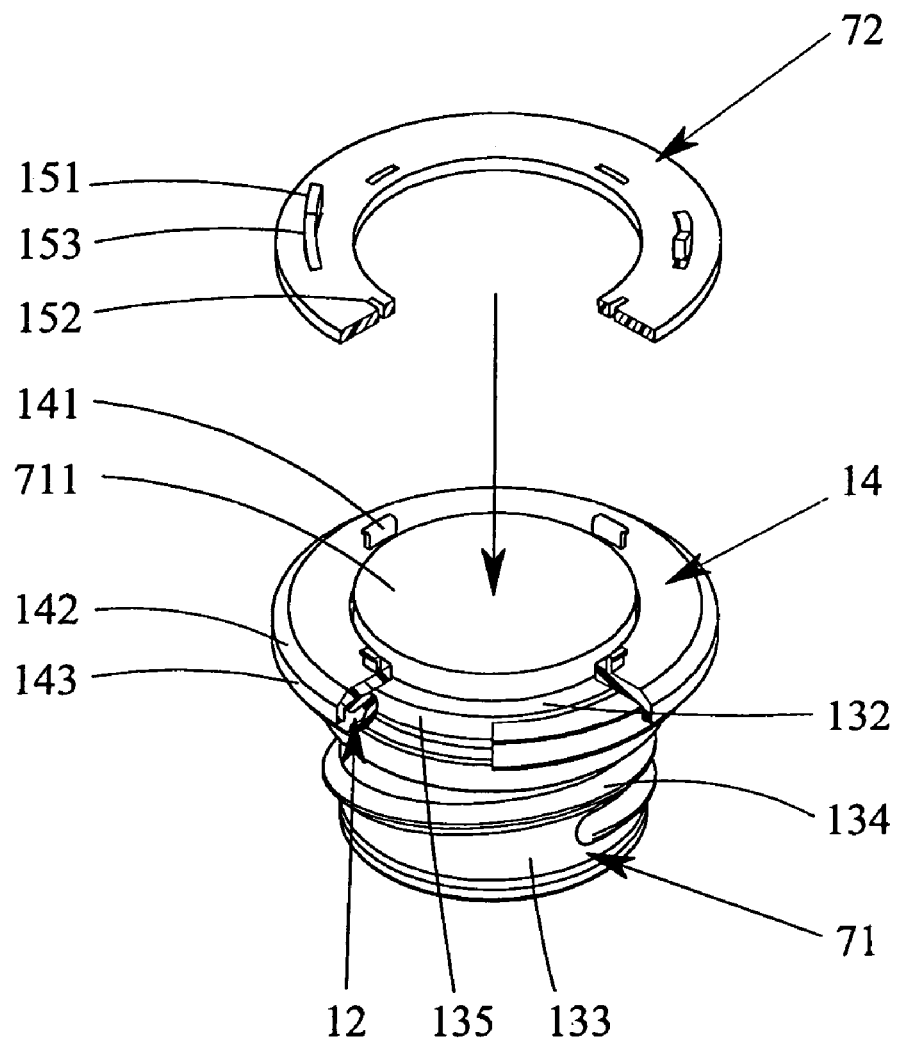
FIG. 13 is a perspective view extracted the pressing plate and the inner cap corresponding to FIG. 2 shows an annular pressing plate to be fitted to a positioning protrusion formed on the top of the inner cap body.

The foregoing embodiment has the construction, in which the supporting plate as an individual member is mounted on the inner cap body. On the other hand, however, it is not necessary for the supporting plate to separate from the inner cap when the outer cap releases from the inner cap. Therefore, as shown in FIG. 12, the inner cap 61 formed by the inner cap body 611 integrally with the supporting plate 612 may be applied. Moreover, as shown in FIG. 2, the foregoing embodiment exemplifies the substantially disc-shaped pressing plate 15, which is laid over the positioning protrusion 131 of the inner cap body 133 and the annular supporting plate 14. However, the lower face of the pressing plate 15 necessary for forming the annular groove 146 is limited to the vicinity of the peripheral edge. Therefore, for example, the inner cap 71 provided with the positioning protrusion 711 extended upward and the pressing plate 72 having annular shape to be fitted to the positioning protrusion 711 may be applied, as shown in FIG. 13. Alternatively, although not illustrated, the supporting plate may also be provided with the positioning protrusion.

Figure 14:
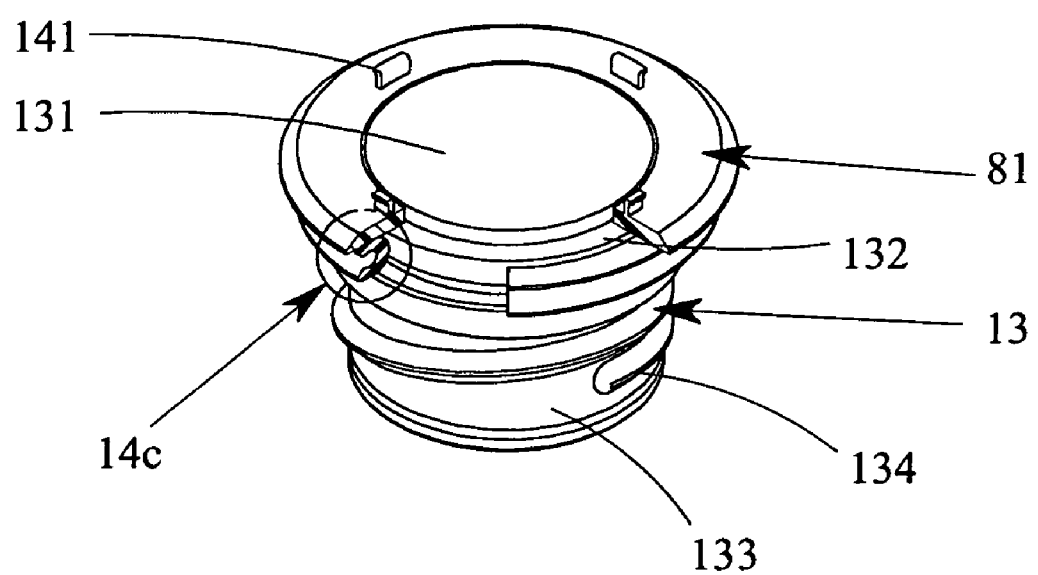
FIG. 14 is a perspective view extracted the inner cap corresponding to FIG. 2 shows a supporting plate having no annular pendulous portion.
Figure 15:
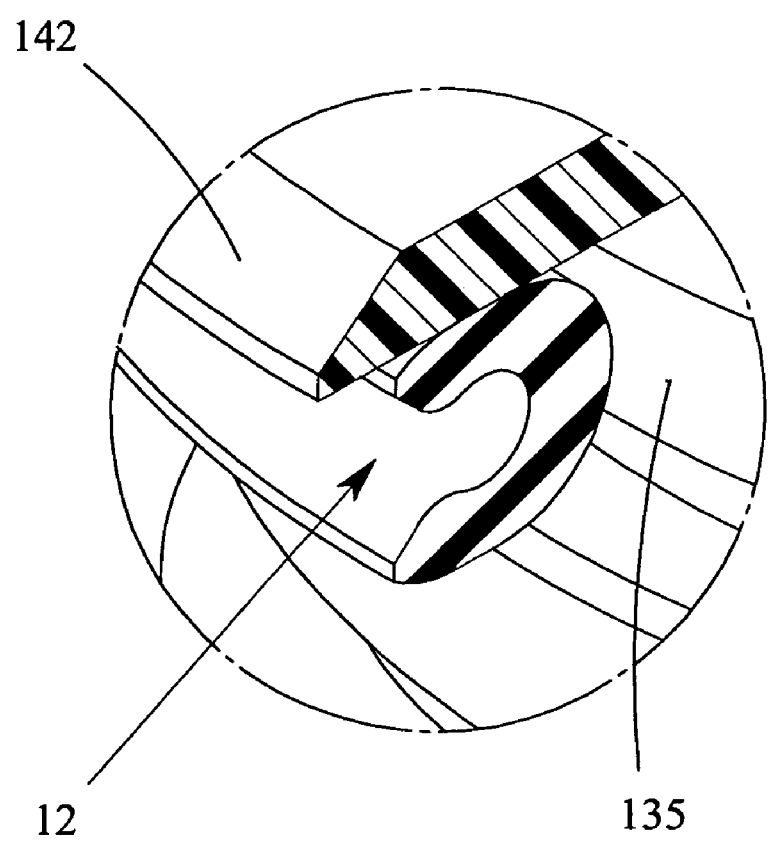
FIG. 15 is a partially enlarged view of a portion encircled in FIG. 14 taken in the direction of arrow 14c.

In addition, the supporting plate in the embodiment is provided on its peripheral edge with the annular pendulous portion so that the wedge-shaped projections that causes damaging the seal ring while the outer cap leaves may be prevented. However, the annular pendulous portion is not essential for the present invention. For example, there may be provided with a supporting plate 81 having no annular pendulous portion, as shown in FIGS. 14 and 15. As long as the configuration of the supporting plate 81 is sufficiently larger than the seal ring 12 in this modification, the wedge-shaped projections 111 do not cause damaging the seal ring 12 when the outer cap 11 is released from the inner cap 13 by the downward external force applied.

What is claimed is:

1. A fuel filler cap comprising: an inner cap of a substantially cylindrical member; and an outer cap of a cover member mounted on said inner cap:
wherein the outer cap includes an upper face portion having a circular shape, a skirt portion integrally extending downward from an outer circumference of the upper face portion, and a plurality of a wedge-shaped projection having a triangular section formed circumferentially intermittently on an inner face of the skirt portion; wherein a pressing plate is a member having a circular shape, as viewed in a top plan, and having a smaller diameter than the internal diameter of the skirt portion; wherein the inner cap includes a supporting plate having a circular shape, as viewed in a top plan, and having an annular slant formed radially downward by chamfering a peripheral edge of an upper face thereof, a seal ring fitted between a lower face of the supporting plate and an outer face of an inner cap body, and an annular groove defined by a lower face of the pressing plate laid over the supporting plate and by the annular slant of the supporting plate and to thereby form into a sectional shape corresponding to a sectional shape of the wedge-shaped projection; wherein the outer cap and the pressing plate are provided with a cap engagement means for engaging in a closing direction of the fuel filler cap; and wherein the pressing plate and the supporting plate are provided with a plate engagement means for turning integrally in opening/closing direction of the fuel filler cap and for releasing an engaged state of the pressing plate with the supporting plate when a releasing load is applied upward to the pressing plate.

2. A fuel filler cap according to claim 1:
wherein the plate engagement means includes a plurality of an engaging projection projecting upward from an upper face of the supporting plate and a plurality of an engaging hole formed in the pressing plate; and wherein the engaging projection includes a hook portion integrally formed on a top end of an projection body having elasticity and engages the hook portion to a peripheral edge of the engaging hole by being inserted through the engaging hole, so that the engagement between the hook portion and the peripheral edge of the engaging hole is to be released in case that the releasing load or greater is applied upwardly.

3. A fuel filler cap according to claim 1:
wherein the plate engagement means includes a plurality of the engaging projection projecting downward from a lower face of the supporting plate and a plurality of the engaging hole formed in the pressing plate; and wherein the engaging projection includes the hook portions integrally formed on a bottom end of the projection body having elasticity and engages the hook portion to the peripheral edge of the engaging hole by being inserted throughout the engaging hole, so that the engagement between the hook portion and the peripheral edge of the engaging hole is to be released in case that the releasing load or greater is applied upwardly.

4. A fuel filler cap according to claim 1:
wherein the cap engagement means includes a plurality of a ratchet pawl elastically supported on an upper face of the pressing plate and a plurality of a ratchet arranged annularly either on the inner face of the upper face portion of the outer cap or on the inner face of the skirt portion; wherein the ratchet pawl formed on a supporting arm having elasticity; and wherein the ratchet pawl and the ratchet never fail to engage in an opening direction of the fuel filler cap, and engage in a closing direction of the fuel filler cap in case that a substantially less than idling load allowing the supporting arm not to be elastically deformed is applied, but release the engagement and turn the outer cap idly in case that the idling load or greater allowing the supporting arm to be elastically deformed is applied.

5. A fuel filler cap according to claim 1:
wherein the cap engagement means includes a plurality of said ratchet pawl elastically supported either on the inner face of the upper face portion of the outer cap or on the inner face of the skirt portion, and a plurality of the ratchet arranged annularly on the upper face of the pressing plate; wherein the ratchet pawl formed on the supporting arm having elasticity; and wherein the ratchet pawl and the ratchet never fail to engage in the opening direction of the fuel filler cap, and engage in the closing direction of the fuel filler cap in case that the substantially less than idling load allowing the supporting arm not to be elastically deformed is applied, but release the engagement and turn the outer cap idly in case that the idling load or greater allowing the supporting arm to be elastically deformed is applied.

6. A fuel filler cap according to claim 1, wherein the supporting plate crushes the seal ring between a lower face thereof and an upper edge of a filler port while the fuel filler cap is secured in the filler port.

7. A fuel filler cap according to claim 6, wherein, the supporting plate includes an annular pendulous portion surrounding the seal ring.

* * * * *